No. 654,354.  
T. OLDHAM.  
CULTIVATOR.  
(Application filed Mar. 12, 1900.)  
Patented July 24, 1900.
(No Model.)  
2 Sheets—Sheet 1.
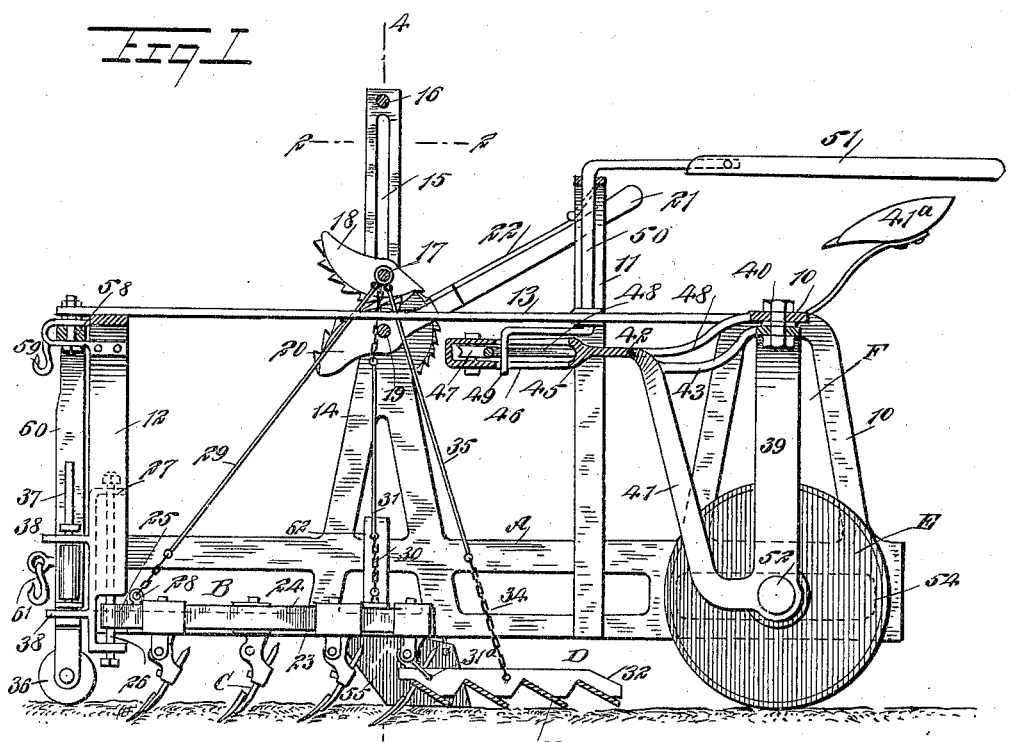
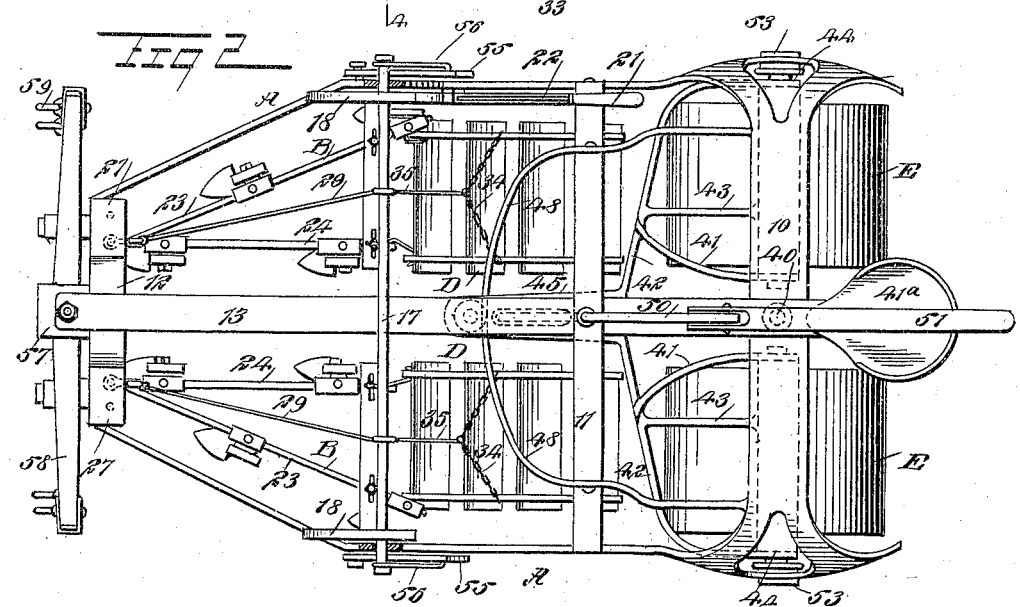
WITNESSES:  
H. Walker  
J. Hedecker  
INVENTOR  
Thomas Oldham  
BY  
Munn  
ATTORNEYS No. 654,354. Patented July 24, 1900.
T. OLDHAM.
CULTIVATOR.
(Application filed Mar. 12, 1900.)
(No Model.) 2 Sheets—Sheet 2.
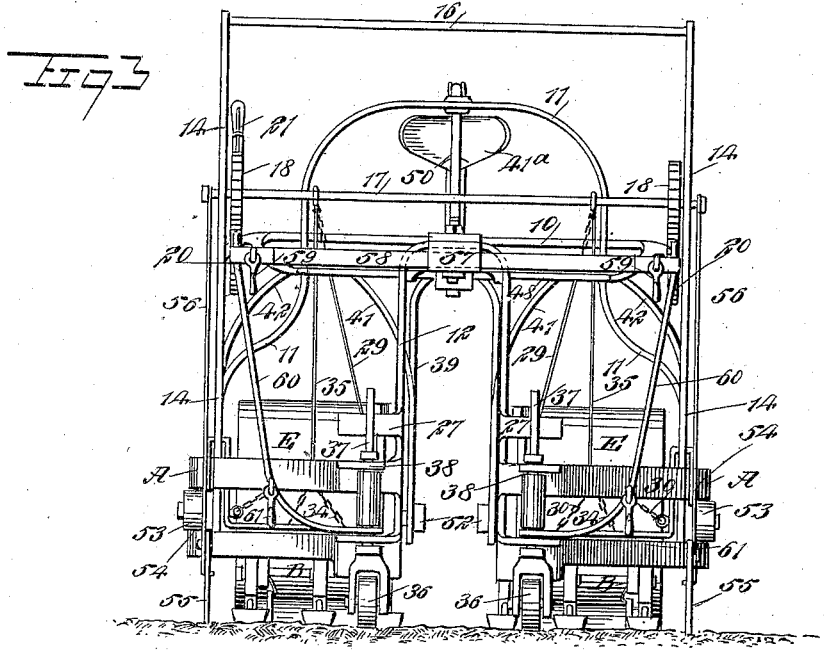
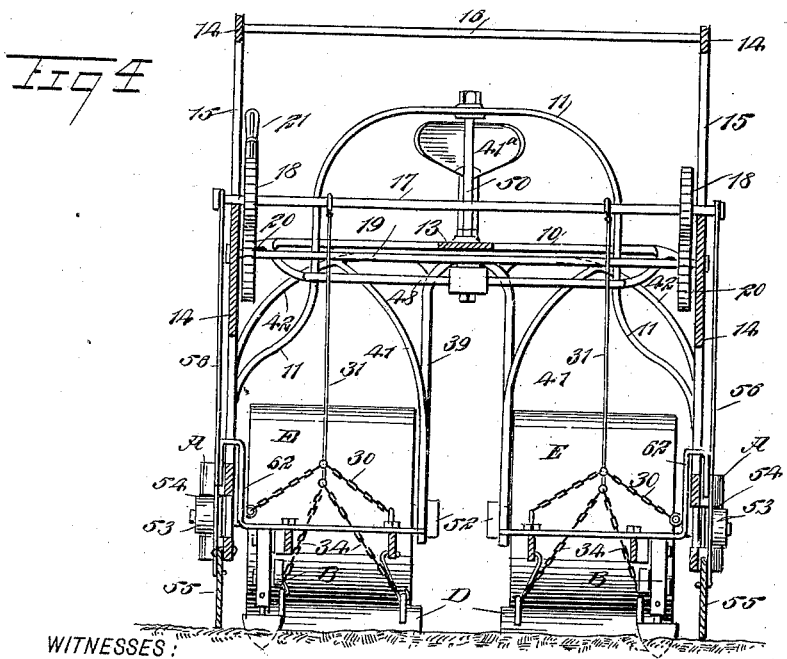
WITNESSES:
H. Walker
J. Feb. Acker
INVENTOR
Thomas Oldham
BY
[signature]
ATTORNEYS

UNITED STATES PATENT OFFICE.

THOMAS OLDHAM, OF LEIPSIC, INDIANA.

CULTIVATOR.

SPECIFICATION forming part of Letters Patent No. 654,354, dated July 24, 1900.

Application filed March 12, 1900. Serial No. 8,391. (No model.)

*To all whom it may concern:*

Be it known that I, THOMAS OLDHAM, a citizen of the United States, and a resident of Leipsic, in the county of Orange and State of Indiana, have invented a new and useful Improvement in Cultivators, of which the following is a full, clear, and exact description.

One purpose of the invention is to provide a double cultivator embodying the features shown in another application made concurrently herewith—namely, including cultivator-frames, drags, guards, and rollers arranged in pairs and in such a manner that two or more rows of plants may be cultivated at the same time.

Another purpose of the invention is to provide a means whereby all the cultivator-frames, drags, and guards may be simultaneously raised and lowered and both rollers simultaneously turned to the right or to the left and the entire machine be under the complete control of the driver.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section through a machine embodying the features of my invention. Fig. 2 is a plan view, a portion of the frame being in section and the section being taken practically on the line 2 2 of Fig. 1. Fig. 3 is a front elevation of the machine, and Fig. 4 is a vertical transverse section taken on the line 4 4 of Fig. 1.

The frame of the machine consists of two side sections A, connected at the back by an upwardly-arched connecting bar or span 10 and at the front by an arch 12, the arch and rear span being connected in their turn by a longitudinal bar or beam 13, and between the center of the frame and the rear portion thereof an upwardly-curved transverse section 11 is provided extending from side to side of the machine and above the upper connecting-bar 13.

Standards 14 are located at each side of the frame between its center and its forward end, and these standards extend beyond the upper connecting-bar 13 and have longitudinal slots 15 produced in their upper portions, and their upper ends are connected by a rod 16 or its equivalent. A shaft 17 is mounted to slide in the slots 15 of the standards 14, and this shaft carries within the frame two segments 18, one being near each end of the shaft, and the convexed surfaces of the segments face downward and are preferably provided with teeth. A shaft 19 is journaled in the standards 14 just below the adjustable shaft 17, and segments 20 are secured to the shaft 19, having their convexed surfaces facing upward and toothed, and corresponding segments 18 and 20 bear such relation to each other that their teeth engage. One of the segments 20 is provided with a lever 21, which extends rearward and carries a thumb-latch 22, adapted for engagement with a rack carried by one of the standards 14, as shown in Fig. 1.

Two cultivator-frames B are employed, located at the front of the machine, one at each side of the center. These frames may consist of any desired number of beams; but preferably, as illustrated, each frame is made up of two beams—namely, an outer and rearwardly-inclined beam 23 and an inner straight beam 24. These beams are brought together at their forward ends, and each beam is provided with an eye 25 at that point, and said eyes are adapted to loosely receive bolts 26, which are carried by lugs 27, extending from the outer sides of the front arch 12. The cultivator-blades or harrow-teeth, whichever may be employed, are connected with the beams of the frames B in any approved manner. Eyebolts 28 are usually secured to the forward ends of the frames B, and these eyebolts are connected, usually by sections of chain and links 29, with the adjustable shaft 17, and chains 30 extend from the inner to the outer beams of the frames B, and said chains are also connected by links 31 with the adjustable shaft 17, a length of chain being usually provided at the upper ends of said links 31, as shown in Fig. 1.

A drag D is used in connection with each cultivator-frame. These drags are detachably connected to the frame, usually through the medium of links 31ª, as shown in Fig. 1, and each drag comprises side bars 32 and cross-plates 33, which have a downward and rearward inclination from the bottom edges of the said bars, as is also best shown in Fig. 1. Each drag is usually provided with a chain 34, which extends from one side bar to the other, and these chains are connected by links 35 with the adjustable shaft 17. Thus it will be observed that by raising and lowering the lever 21 the shaft 17 may be raised and lowered and the cultivator-frames and drags will be correspondingly adjusted as to position.

The forward end of the frame of the machine is supported by wheels 36, located one at each side of the front arch 12, and these wheels are carried by shafts 37, which are mounted in suitable bearings 38, either projected from the sides of the front arch 12 or from the forward portion of the frame.

An auxiliary frame F is pivoted at the rear portion of the main frame. This auxiliary frame consists of an arch 39, which is in longitudinal alinement with the front arch 12, or practically so, and this arch is pivotally attached to the span 10 at the rear of the frame by means of a suitable pivot-pin 40. Arms 41 extend upward and forward from the members of the rear arch 39 and pass over an arched bar 42, which connects at its ends with outwardly-curved side bars 44, attached at their upper ends to the upper portion of the rear arch 39, and brace-bars 43 are carried from the arched bar 42 to the arch 39.

At the central portion of the arched bar 42 a forward horizontally-extending member 45 is formed, and this member is provided with a longitudinal slot 46 and a pulley 47 in front of the slot. This pulley engages with a horizontal guide-bar 48, which is curved in a forward direction from one side of the span 10 of the main frame to the other, usually connecting with the upright loop standard or brace 11. A crank-arm 49 is passed down through the slot 46 in the extension of the auxiliary frame F, and this crank-arm forms a portion of the crank-shaft 50, journaled in the upper portion of the loop-standard 11, and this crank-shaft is provided with a hinged handle 51, adapted to extend in direction of the driver's seat 41$^a$, which is supported at the rear of the machine. Thus it will be observed that the driver may readily turn the auxiliary frame F to the right or to the left and that it will be guided in such movements. This auxiliary frame is adapted to carry two rollers E, and the shafts 52 of these rollers are journaled in the members of the rear arch 39 and in the side bars 44 of the auxiliary frame, and at the outer end of each of the shafts 52 a roller 53 is journaled, adapted to travel in guideways 54, formed in the sides of the frame at its rear portion.

A guard or fender 55 is pivoted at each side of the main frame at a point where the drags connect with the cultivator-frames, and these guards or fenders are connected by links 56 with the adjustable shaft 17, so that they are raised and lowered correspondingly with the movements of the cultivator-frames and drags. A bearing 57 is formed upon the main frame in front of the upper portion of the front arch 12, and an equalizing-bar 58 is pivoted in this bearing, said bar having hooks 59 or like devices adapted for attachment to single or double trees, located at or near its ends. Guide-bars 60 are detachably connected with the ends of the equalizing-bar 58, and these guide-bars extend downward and are preferably curved inward and detachably pivoted upon the shafts 37, which carry the front supporting-wheels 36. Hooks 61 are attached to the lower portion of these side bars. When the plants are large, the single or double tree of the team is attached to the hooks carried by the equalizing-bar and the singletrees to the hooks 61; but when the plants are small the side bars 60 are removed and the bearing 57 is secured upon the shaft 37. It will be observed that the equalizing-bar 58 serves to equalize the draft on both occasions.

The machine is exceedingly simple. It is durable, and it is economic, and any of the operative parts may be quickly and readily removed when not needed, thus reducing the weight of the machine. It is also obvious that all of the operative parts, with the exception of the rollers, may be simultaneously adjusted and that both rollers may be turned to the right or to the left at the same time for the purpose of steering the machine. I also desire it to be understood that guide-bars 62 are secured to the upper faces of the beams of the cultivator-frames, which guide-bars have bearing against the side sections of the main frame and serve to prevent the cultivator-frames from having undue lateral movement. It will be further understood that the fenders 55 may be placed wherever desired.

Having thus described my invention, I claim as new and desire to secure by Letters Patent—

1. In a cultivator, a main frame, a pair of rollers for supporting the main frame at the rear, a pair of wheels for supporting the main frame at the front, cultivator-frames arranged in pairs and pivotally attached to the forward portion of the main frame, a pivoted supporting-frame for the rollers independent of the main frame, means for turning said supporting-frame, and an adjusting device for the cultivator-frames, as set forth.

2. In a cultivator, a main frame, wheel-supported at the front and roller-supported at the rear, the rollers being in pairs, a pivoted frame independent of the main frame, and in which the said rollers are mounted, a shifting lever for the roller-carrying frame, cultivator-frames pivotally attached at the forward portion of the main frame, said cultivator-frames having vertical adjustment, an adjusting-shaft connected with the cultivator-frames, an adjusting mechanism for the said shaft substantially as described, and drags connected with the cultivator-frames and having connection with the adjusting-shaft, as set forth.

3. In a cultivator, a main frame open centrally at the front and at the rear, supporting-wheels at each side of the front opening in the frame, rollers at each side of the rear opening in the main frame, a pivoted supporting-frame for the said rollers, a steering-lever connected with the said roller-supporting frame, a cultivator-frame pivoted at each side of the center of the main frame at its forward portion and having vertical adjustment on said main frame, a drag connected with each of the cultivator-frames, a shaft having vertical movement, a support for the said shaft, toothed segments carried by the said shaft, and lifting-segments carried by a second and rotary shaft, means for turning the latter shaft, and connections between the vertically-movable shaft and the cultivator-frames and drags.

4. In a cultivator, the combination, with a frame provided with a front and a rear arch, supporting-wheels at each side of the forward arch, an equalizing-bar pivoted at the front portion of the frame and having downwardly-extending members pivoted to the frame, an auxiliary frame pivotally attached to the rear portion of the main frame, rollers journaled at each side of the center of the auxiliary frame, guides for the said rollers, and a steering-lever arranged to turn the roller-supporting frame to the right or to the left, of cultivator-frames pivoted one at each side of the center of the main frame at the front, each cultivator-frame being capable of vertical adjustment, supports carried from the main frame, a shaft vertically adjustable in the said supports, a second shaft mounted to turn in the supports below the adjustable shaft, toothed segments carried by the adjustable shaft, meshing toothed segments carried by the rotating shaft, a lever whereby the rotating shaft is rocked and its segments are brought into lifting action, and a connection between the cultivator-frames and the adjustable shaft, as specified.

5. In a cultivator, the combination, with a frame provided with a front and with a rear arch, supporting-wheels at each side of the forward arch, an equalizing-bar pivoted at the front portion of the frame and having downwardly-extending members pivoted to the frame, an auxiliary frame pivotally attached to the rear portion of the main frame, rollers journaled at each side of the center of the auxiliary frame, guides for the said rollers, and a steering-lever arranged to turn the roller-supporting frame to the right or to the left, of cultivator-frames pivoted one at each side of the center of the main frame at the front, each cultivator-frame being capable of vertical adjustment, supports carried from the main frame, a shaft vertically adjustable in the said supports, a second shaft mounted to turn in the supports below the adjustable shaft, toothed segments carried by the adjustable shaft, meshing toothed segments carried by the rotating shaft, a lever whereby the rotating shaft is rocked and its segments are brought into lifting action, a connection between the cultivator-frames and the adjustable shaft, drags attached to the cultivator-frames and connected with the adjustable shaft, and guards or fenders pivoted to the main frame and likewise connected with the adjusting-shaft, as and for the purpose specified.

In testimony whereof I have signed my name to this specification in the presence of two subscribing witnesses.

THOMAS OLDHAM.

Witnesses:
JONCE MONYHAN,
CHARLES P. COLLINS.